(12) United States Patent
Kim (10) Patent No.: US 8,819,730 B2
(45) Date of Patent: Aug. 26, 2014

(54) APPARATUS AND METHOD FOR NON-NETWORK CHANNEL SCANNING IN DIGITAL VIDEO BROADCASTING SYSTEM

(75) Inventor: Eung-Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 514 days.

(21) Appl. No.: 12/877,464

(22) Filed: Sep. 8, 2010

(65) Prior Publication Data

US 2011/0058633 A1    Mar. 10, 2011

(30) Foreign Application Priority Data

Sep. 9, 2009 (KR) .................. 10-2009-0084713

(51) Int. Cl.
*G06F 3/00* (2006.01)
*H04N 7/20* (2006.01)
*H04N 5/50* (2006.01)

(52) U.S. Cl.
USPC .............. 725/38; 725/63; 725/68; 348/731; 348/732

(58) Field of Classification Search
CPC .... H04N 21/482; H04N 21/6143; H04N 5/50
USPC .................... 725/38, 63, 68; 348/731–732
See application file for complete search history.

(56) References Cited

U.S. PATENT DOCUMENTS

| | | | |
|---|---|---|---|
| 7,697,077 B2* | 4/2010 | Van Horck | 348/731 |
| 2005/0034173 A1* | 2/2005 | Hatanaka | 725/151 |
| 2009/0225168 A1* | 9/2009 | Clay | 348/177 |

FOREIGN PATENT DOCUMENTS

| | | |
|---|---|---|
| EP | 1 876 810 A2 | 1/2008 |
| EP | 2 028 847 A2 | 2/2009 |
| KR | 10-2009-0080320 A | 7/2009 |
| WO | 01/28093 A1 | 4/2001 |

* cited by examiner

*Primary Examiner* — Gigi L Dubasky
(74) *Attorney, Agent, or Firm* — Jefferson IP Law, LLP (57) ABSTRACT

An apparatus and a method for commonly applying channel scanning to non-network scanning schemes in a digital video broadcasting system are provided. The method includes deleting all services stored in a database, temporarily storing services scanned through each frequency in a temporary storage unit, and performing channel scanning for all frequencies. Accordingly, the same service including different Logical Channel Numbers (LCNs) that is repeatedly stored or another service including the same LCN that is not stored in a Multi Frequency Network (MFN) boundary area using the non-networking scanning scheme is prevented.

11 Claims, 3 Drawing Sheets

APPARATUS AND METHOD FOR NON-NETWORK CHANNEL SCANNING IN DIGITAL VIDEO BROADCASTING SYSTEM

PRIORITY

This application claims the benefit under 35 U.S.C. §119(a) of a Korean patent application filed in the Korean Intellectual Property Office on Sep. 9, 2009 and assigned Serial No. 10-2009-0084713, the entire disclosure of which is hereby incorporated by reference.

BACKGROUND OF THE INVENTION

1. Field of the Invention

The present invention relates to an apparatus and a method for non-network channel scanning. More particularly, the present invention relates to an apparatus and a method for non-network channel scanning in a digital video broadcasting system.

2. Description of the Related Art

From among digital broadcast systems, a Digital Video Broadcasting (DVB) system is widely used.

The DVB system employs two scanning schemes for searching for available service and Service Information (SI), and for storing the available service and SI in a database located in a non-volatile memory.

A first scheme is a network scanning scheme, which is used in standards for a satellite broadcast and cable broadcast, an entire network of which is managed by broadcast providers. In the first scheme, a preset channel (i.e., a Transport Stream (TS) in which services are multiplexed, or a broadcast stream corresponding to a physical frequency) carries SI of another channel, so that it is possible to obtain SI of all channels from one channel, which enables convenient scanning. Further, since one broadcast provider manages the entire network, it is possible to scan the entire network according to the same scanning scheme.

A second scheme is a non-network scanning scheme, in which multiple broadcast providers use different channels of the same network without a separate service provider managing the entire network. The non-network scanning scheme is used for terrestrial and handheld broadcast standards. In the non-network scanning scheme, for scanning, it is required to obtain information (i.e., SI) from each channel. Further, since the non-network scanning scheme mainly uses a Multi Frequency Network (MFN), a physical frequency of the service is different according to the area, and the same service may be repeatedly scanned in multiple frequencies in an MFN boundary area. Further, when different services have the same Logical Channel Number (LCN), it may be impossible to store the service.

Figure 1:
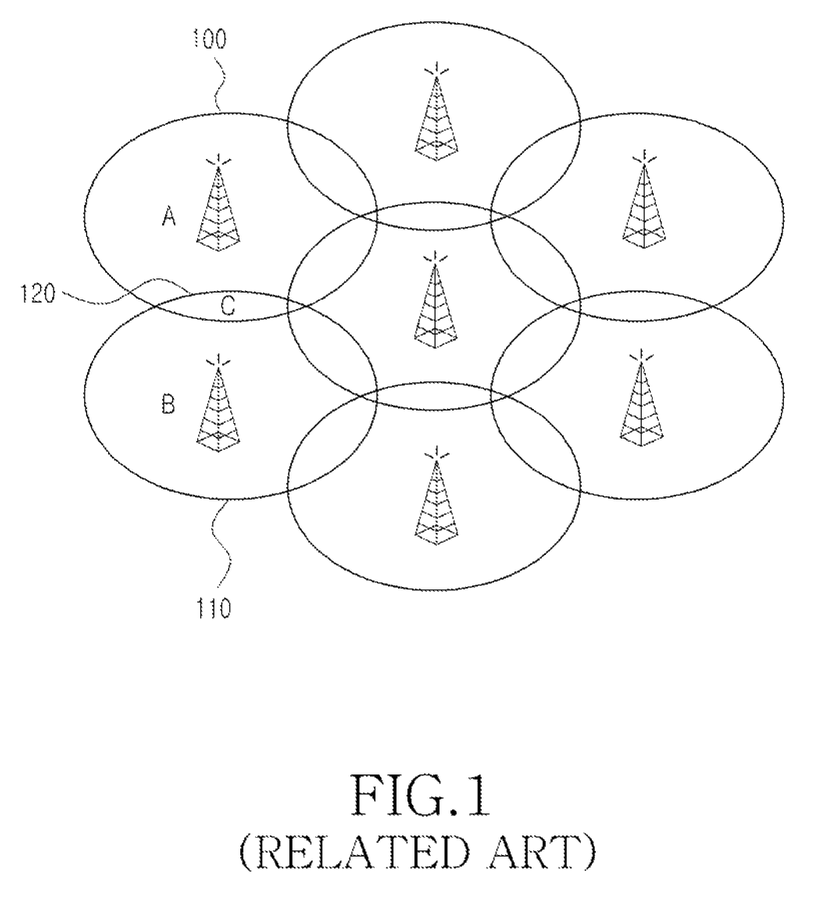
FIG. 1 illustrates an example of a service in a Multi Frequency Network (MFN) boundary area according to the related art.

FIG. 1 illustrates an example of a service in an MFN boundary area according to the related art.

Table 1 below shows an example of a result of scanning according to a scanning standard, to which the LCN is applied, in a C cell 120 of FIG. 1, which is an MFN boundary area.

TABLE 1

| Service Number | Service Name | Frequency | Problem |
| --- | --- | --- | --- |
| 1 | AAA | 570 MHz | |
| 2 | DDD | 570 MHz | 1. Due to different LCNs, both services |
| 3 | DEF | 578 MHz | should be stored although they are the |

TABLE 1-continued

| Service Number | Service Name | Frequency | Problem |
| --- | --- | --- | --- |
| | | | same service. |
| 4 | FFF | 586 MHz | 2. Due to the same LCN, HHH is not stored. |
| 12 | OOO | 586 MHz | |
| | | | 2. Due to no LCN, PPP is not stored. |

Table 2 below shows a result of the scanning in an A cell 100 and a B cell 110.

TABLE 2

| Service ID | Service Name | LCN | Frequency |
| --- | --- | --- | --- |
| A cell | | | |
| 0x0080 | AAA | 1 | 570 MHz |
| 0x0130 | DDD | 2 | 570 MHz |
| 0x0282 | FFF | 4 | 586 MHz |
| 0x0681 | OOO | 12 | 586 MHz |
| B cell | | | |
| 0x0080 | AAA | 1 | 578 MHz |
| 0x0130 | DEE | 3 | 578 MHz |
| 0x0375 | HHH | 4 | 592 MHz |
| 0x0682 | PPP | None | 592 MHz |

Hereinafter, a result of scanning in the C cell 120, which is an MFN boundary area, will be discussed.

When a service Identifier (ID) is 0x0080, the services are scanned through two frequencies although they are the same. That is, the service is scanned through 570 MHz in an area corresponding to the A cell 100, and is scanned through 578 MHz in an area corresponding to the B cell 110. However, since the service in the A cell 100 and the B cell 110 have the same LCN, based on an assumption that the service scanned first is maintained, only the service with the frequency of 570 MHz is stored from among the two normal services as shown in Table 1.

When the service ID is 0x0130, the services have the same service ID and different LCNs. In this case, both of the services are stored in Table 1. However, a problem exists in that both DDD and DEE are stored.

Further, when the services have service IDs of 0x0282 and 0x0375, the services are different but have the same LCN of 4. Therefore, based on an assumption that the service scanned first is maintained, HHH is not stored. That is, a problem exists in that one of the two services is not stored.

Further, when the service has a service ID of 0x0681, since the LCN of the service is 12 and the service name is OOO, the service is normally stored. However, when the service has a service ID of 0x0682, since the service does not have an LCN, the service is not stored.

Based on the above-described problems, a scanning scheme for addressing the problems of each country is temporarily applied to the country. As a result, application of different scanning schemes to different countries increases maintenance expenses.

Meanwhile, the non-network scanning includes automatic scanning, which scans an entire frequency table of a country, and manual scanning, which scans a particular frequency. In general, most countries use the LCN. The LCN is a specific service number allocated to each service. In a country that does not use the LCN, numbers are sequentially allocated to the services from number 1.

A scanning scheme in a standard using the LCN is described below.

1. An automatic scanning scheme in a standard using the LCN is as follows:
   1) All services stored in a database are deleted.
   2) Scanning is performed until the scanning is completed for all the frequencies, while the services scanned in each frequency are stored in a memory with LCNs as service numbers.
   3) The services stored in the memory are stored in a database.

2. A manual scanning scheme in a standard using the LCN is as follows:
   1) Services of the frequency to be scanned from among the services already stored in a database are deleted.
   2) The scanned services are stored in a memory with LCNs as service numbers.
   3) The services stored in the memory are stored in a database.

3. An automatic scanning scheme in a standard that does not use the LCN is as follows:
   1) All services stored in a database are deleted.
   2) Scanning is performed until the scanning is completed for all the frequencies, while the services scanned in each frequency are stored in a memory with LCNs as service numbers.
   3) The services stored in the memory are stored in a database.

4. A manual scanning scheme in a standard that does not use the LCN is as follows:
   1) Services of the frequency to be scanned from among the services already stored in a database are deleted.
   2) The scanned services are stored in a memory.
   3) The services stored in the memory are stored in a database while sequentially matching the services to service numbers omitted in the database or numbers from a number next to the last number existing in the database.

As described above, when it is necessary to apply different scanning schemes according to whether the LCN is used, different applications are necessary according to the countries. Further, when a service that does not have an LCN exists in the standard using the LCN, scanning is impossible although scanning may be necessary based on inaccurate information of SI data in a field.

Therefore, a need exists for a scanning method in which scanning is possible regardless of LCN use standards.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for scanning to prevent the same service including different Logical Channel Numbers (LCNs) from being repeatedly stored or another service including the same LCN from not being stored in a Multi Frequency Network (MFN) boundary area using a non-networking scanning scheme.

Another aspect of the present invention is to provide an apparatus and a method for commonly applying channel scanning regardless of use of the LCN using a non-networking scanning scheme.

Still another aspect of the present invention is to provide an apparatus and a method for commonly applying channel scanning, which can consistently operate even in a variable digital broadcast system and network.

In accordance with an aspect of the present invention, a method for channel scanning in a digital broadcast system is provided. The method includes deleting all services stored in a database, temporarily storing services scanned through each frequency in a temporary storage unit, and performing a channel scanning for all frequencies.

In accordance with another aspect of the present invention, a method for channel scanning in a digital broadcast system is provided. The method includes copying services except for services of a frequency to be scanned from among services stored in a database into a temporary storage unit and deleting all the services stored in the database, temporarily storing scanned services together with the service copied from the database in the temporary storage unit, and performing a channel scanning for the frequency to be scanned.

In accordance with still another aspect of the present invention, an apparatus for channel scanning in a digital broadcast system is provided. The apparatus includes a control unit for deleting all services stored in a database, temporarily storing services scanned through each frequency in a temporary storage unit, performing a channel scanning for all frequencies, selecting at least one service from the services including an identical service Identifier (ID) and deleting unselected services when there are services including the identical service ID as a result of the channel scanning, determining if services remaining after the services including the identical service ID are removed from the scanned services include services including an identical LCN, selecting one service from the services including the identical LCN and allocating LCNs sequentially increasing from an LCN after a last LCN to unselected services according to each service type when the remaining services include the services including the identical LCN, determining if the services remaining after the services including the identical service ID are removed from the scanned services include services that do not include the LCN, and allocating LCNs sequentially increasing from the LCN after the last LCN to the services that do not include the LCN when the remaining services include the services that do not include the LCN, and the temporary storage unit for temporarily storing services scanned through each frequency.

In accordance with a further aspect of the present invention, an apparatus for channel scanning in a digital broadcast system is provided. The apparatus includes a control unit for copying services except for services of a frequency to be scanned from among services stored in a database into a temporary storage unit and deleting all the services stored in the database, temporarily storing scanned services together with the service copied from the database in the temporary storage unit, performing a channel scanning for the frequency to be scanned, selecting at least one service from the services including an identical service ID and deleting unselected services when there are services including the identical service ID as a result of the channel scanning, determining if services remaining after the services including the identical service ID are removed from the scanned services include services including an identical LCN, selecting one service from the services including the identical LCN and allocating LCNs sequentially increasing from an LCN after a last LCN to unselected services according to each service type when the remaining services include the services including the identical LCN, determining if the services remaining after the services including the identical service ID are removed from the scanned services include services that do not include the LCN, and allocating LCNs sequentially increasing from the LCN after the last LCN to the services that do not include the LCN when the remaining services include the services that do not include the LCN, the temporary storage unit for temporarily storing services scanned through each frequency.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a commonly applicable scanning method for all non-networking scanning schemes using or not using a Logical Channel Number (LCN) in a Multi Frequency Network (MFN) boundary area which may occur in a non-networking scanning schemes.

Figure 2:
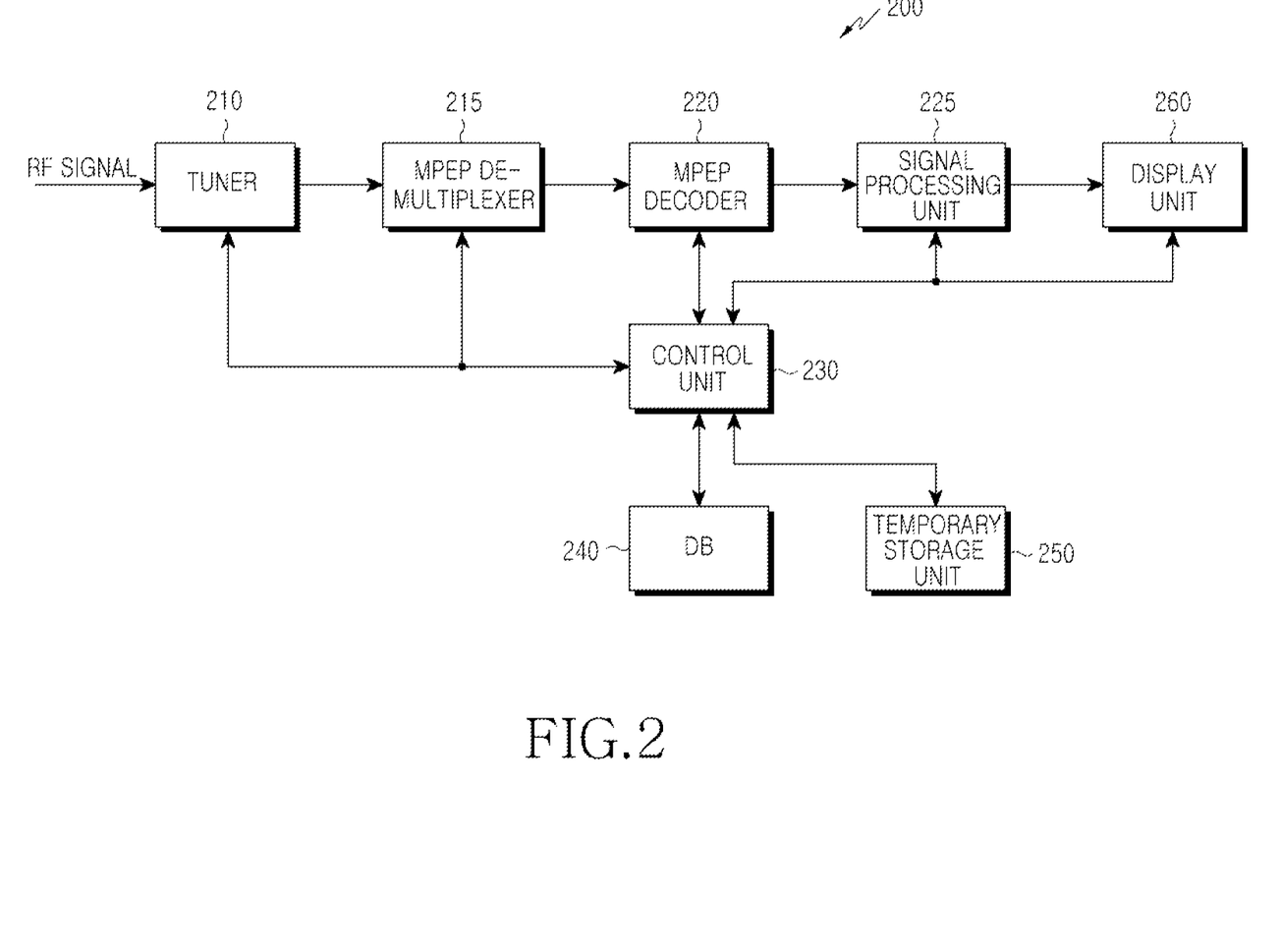
FIG. 2 is a block diagram of a digital broadcast receiver according to an exemplary embodiment of the present invention.

FIG. 2 is a block diagram of a digital broadcast receiver according to an exemplary embodiment of the present invention.

Referring to FIG. 2, the digital broadcast receiver 200 includes a tuner 210, a Moving Picture Experts Group (MPEG) demultiplexer 215, an MPEG decoder 220, a signal processing unit 225, a control unit 230, a DataBase (DB) 240, a temporary storage unit 250, and a display unit 260. The digital broadcast receiver 200 may include a set-top box, which is either connected to a TeleVision (TV) set or incorporated within the TV, may include a receiver for receiving an encoded signal, such as an audio and/or video signal, or a non-encoded signal, and may be either a stationary receiver or a portable receiver. Further, signals received by the digital broadcast receiver 200 may include signals transmitted from various means.

The term "MPEG" refers to data transmission standards developed by the Moving Picture Experts Group, which is a working group of the International Organization for Standardization (ISO), that has a concept including the MPEG-2 standard, which has been developed for non-exclusive digital television application, MPEG-4 standard, and other MPEG-compatible standards. The term MPEG, as described herein, includes all MPEG modifications, changes, and developments applicable to digital data transmission, including a Digital Video Broadcasting (DVB) standard.

The tuner 210 receives a Radio Frequency (RF) signal, which is an RF band digital broadcast signal transmitted from a plurality of channels, converts the RF signal to an Intermediate Frequency (IF) signal, filters and amplifies the IF signal, and outputs the filtered and amplified signal in a Transport Stream (TS) stream for each channel to the MPEG demultiplexer 215. The tuner 210 includes a mobile (i.e., handheld) tuner as well as a terrestrial tuner of the DVB.

The MPEG demultiplexer 215 demultiplexes the TS, in which an audio signal, a video signal, and additional information are multiplexed. The MPEG demultiplexer 215 then outputs the demultiplexed TS to the MPEG decoder 220.

The MPEG decoder 220 decodes the output signal of the MPEG demultiplexer 215.

The signal processing unit 225 processes the audio and/or video signal input from the MPEG decoder 220 to generate and output a signal that may be displayed by the display unit 260.

The display unit 260 displays the audio and/or video signal output from the signal processing unit 225. Various types of display modules, such as a Digital Light Processing (DLP), a Liquid Crystal Display (LCD), and a Plasma Display Panel (PDP), may be applied to the display unit 260.

The control unit 230 performs general control of a digital broadcast receiver and may be implemented by a memory storing various control codes. The control unit 230 may include a Micro Controller Unit (MCU) including a processor for executing a control code, a Central Processor Unit (CPU), and the like.

The control unit 230 individually controls the tuner 210, the MPEG demultiplexer 215, the MPEG decoder 220, the signal processing unit 225, the DB 240, the temporary storage unit 250, and the display unit 260 for application of a commonly applicable scanning method according to an exemplary embodiment of the present invention. Further, the control unit 230 controls processing of services having the same service IDentifier (ID), controls processing of services that have the same LCN, controls processing of services that do not have the same LCN, and controls final storage of the processed services in the DB 240.

The DB 240 stores various data necessary for operations of programs for channel scanning in a digital broadcast receiver, and may be included in a non-volatile memory. The non-volatile memory may include at least one of an Electrically Erasable Programmable Read-Only Memory (EEPROM) and a flash memory. The EEPROM is characterized in that it should take a break during a preset period of time after recording data in a writing job. That is, the EEPROM is required to take a break for 10 msec for each 16 bytes.

The temporary storage unit 250 temporarily stores the services scanned through each frequency in an automatic scanning scheme, and temporarily stores the scanned services together with services copied from the DB 240 in a manual scanning scheme.

In an exemplary implementation, the services that do not have the LCN correspond to numbers sequentially increasing from a number next to the last LCN according to the service type (e.g., TV or Radio). Therefore, even the services that do not have the LCN may be commonly processed. Also, in a case of using the LCN, a service that does not have the LCN, due to an error in Service Information (SI) data, can be stored.

In a case where the services have the same service ID, the user is notified of information, including a service name, a service number, and a Signal to Noise Ratio (SNR), so that the user may select one service or multiple services. A message for selection of one service or multiple services from the services having the same service ID is shown to the user so that the user may select one or more services. Further, if there is no selection by the user even after passage of a time interval determined by a timer, a first scanned service is selected as default.

In a case where the services have the same LCN, the user is notified of information, including the service name, the service number, and the Signal to Noise Ratio (SNR), so that the user may select a service capable of maintaining the LCN. If there is no selection by the user, even after passage of a time interval determined by a timer, a first scanned service is selected as default. Other services are sequentially matched to numbers sequentially increasing from the number after the last LCN according to the service type (e.g., TV or Radio).

Hereinafter, a channel scanning method according to an exemplary embodiment of the present invention will be described below with reference to FIG. 3. The channel scanning method is based on an assumption that the channel scanning method is performed after a user has purchased a product or when the user must change the broadcast channel frequency according to an area.

Figure 3:
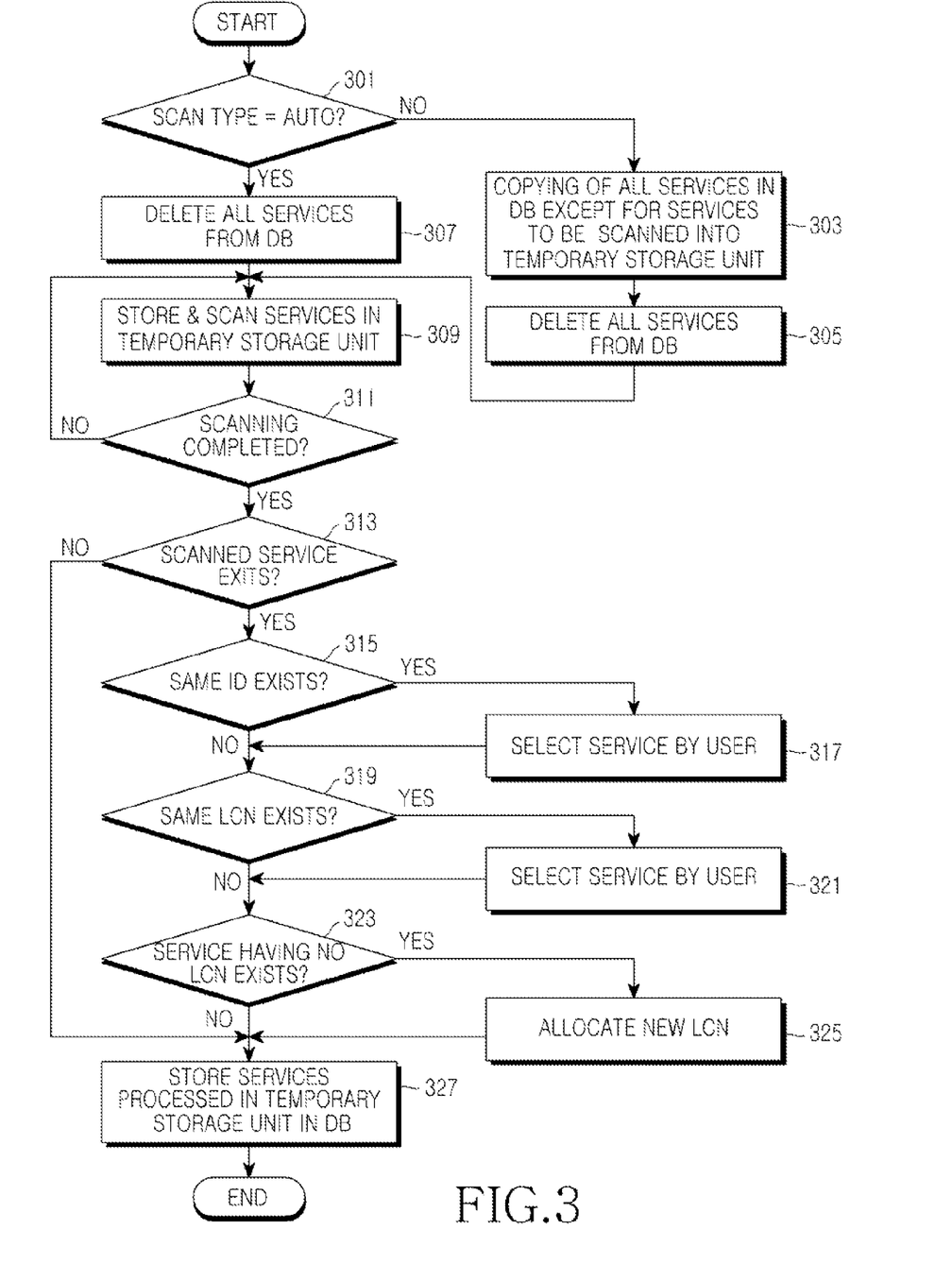
FIG. 3 is a flowchart illustrating a channel scanning method according to an exemplary embodiment of the present invention.

FIG. 3 is a flowchart illustrating a channel scanning method according to an exemplary embodiment of the present invention.

Referring to FIG. 3, in step 301, the control unit 230 determines if the scanning type is an automatic scanning or a manual scanning.

Thereafter, if it is determined that the scanning type is the automatic scanning, the control unit 230 controls the DB 240 for deletion of all services stored in the DB 240 in step 307. Under the control of the control unit 230, the DB 240 deletes all the services stored therein. In step 309, the control unit 230 stores the services scanned through each frequency in the temporary storage unit 250 and performs scanning for all the frequencies.

In step 311, the control unit 230 determines if the scanning has been completed.

If it is determined that the scanning has not been completed, the control unit 230 stores the services scanned through each frequency in the temporary storage unit 250 and performs scanning for all the frequencies in step 309. In contrast, if it is determined that the scanning has been completed, the control unit 230 determines in step 313 if a scanned service exists. If it is determined that the scanned service does not exists, the control unit 230 transfers the processed service from the temporary storage unit to the DB 240 in step 237.

However, if it is determined that a scanned service exists in step 313, the control unit 230 determines if there are services having the same service ID among all the scanned services in step 315. If it is determined that there are services that have the same service ID, i.e., the services are the same service transmitted through different frequencies from different transmitters of an MFN boundary area, the control unit 230 controls the display unit 260 to notify a user of the SI and displays a message for selection of a service to the user in step 317. If one or more services are selected by the user in step 317, the control unit 230 removes non-selected services, from the temporary storage unit 250, and determines if the services remaining after the same services are removed from all the scanned services include services having the same LCN, in step 319.

If it is determined that the remaining services include services having the same LCN, i.e., different services having been transmitted with the same LCN from different transmitters in the MFN boundary area because the same services have been already excluded, the control unit 230 controls the display unit 260 to notify the user of SI and displays to the user a message for selection of a service, the LCN of which the user will maintain. If a service is selected by the user in step 321, the control unit 230 allocates new numbers to the services, which have not been selected. That is, the control unit 230 allocates numbers sequentially increasing from the number after the last LCN to the unselected services according to the service type (e.g., TV or Radio). In step 323, the control unit 230 determines if the scanned services include a service that does not have the LCN. If it is determined that the scanned services include one or more services that do not have the LCN, the control unit 230 allocates new numbers to the services that do not have the LCN in step 325. More specifically, the control unit 230 allocates numbers sequentially increasing from the number after the last LCN to the services that do not have the LCN according to the service type (e.g., TV or Radio). Thereafter, in step 327, the control unit 230 controls the temporary storage unit 250 for transfer of the stored services from the temporary storage unit 250 to the DB 240. Under the control of the control unit 230, the services processed in the temporary storage unit 250 are stored in the DB 240. However, if it is determined that the scanned services do not include a service that do not have the LCN, the control unit 230 controls the temporary storage unit 250 to transfer the stored services to the DB 240 in step 327.

Meanwhile, if it is determined that the scanning type is manual scanning, the control unit 230 controls the DB 240 and the temporary storage unit 250 for copying all services in the DB 240, except for the current services (i.e., services to be scanned), into the temporary storage unit 250 in step 303. That is, under the control of the control unit 230, all services except for the current services are copied from the DB 240 into the temporary storage unit 250. In step 305, the control unit 230 controls the DB 240 for deletion of all the services in the DB 240. That is, under the control of the control unit 230, the DB 240 deletes all the services stored therein.

Thereafter, the same operation in steps 309 to 327 of the auto scanning is performed. However, if it is determined that the scanning type is the manual scanning, the services already stored in the DB 240 are stored together with the newly scanned services in step 309, differently from the auto scanning.

Table 3 below shows a scanning result in the MFN boundary area C, to which the scanning method of an exemplary embodiment of the present invention is applied. Table 3 is based on an assumption that all services correspond to the TV type and the user selection is defaulted.

TABLE 3

| Service Number | Service Name | Frequency | Solution |
|---|---|---|---|
| 1 | AAA | 570 MHz | |
| 2 | DDD | 570 MHz | 1. In order to process the same services, the services scanned in the memory are processed after being temporarily stored in the temporary storage unit in a case of auto scanning, while the scanned services together with the services already stored in the DB are stored in the temporary storage unit before being processed in a case of manual scanning. |
| 4 | FFF | 586 MHz | |
| 12 | OOO | 586 MHz | |
| 13 | HHH | 592 MHz | 2-1. In order to process the services having the same LCN, the services scanned in the memory are processed after being temporarily stored in the temporary storage unit in the case of auto scanning, while the scanned services together with the services already stored in the DB are processed after being stored in the temporary storage unit in the case of manual scanning.<br>2-2. In order to prevent overlapping of the LCN, numbers are allocated from the number after the last LCN. |
| 14 | PPP | 592 MHz | 3. In order to prevent overlapping of the LCN for the services that do not have the LCN, numbers are allocated from the number after the last LCN. |

Scanning results are discussed below with reference to Table 2.

First, it is determined whether services having the same service ID exist. The same service IDs include 0x0080 and 0x0130. When the service ID is 0x0080, the services have the same service name of "AAA" and the same LCN of 1. In this case, the service of 570 MHz scanned first as default is selected, and the service name of "AAA" is allocated to service No. 1 as shown in Table 3.

Further, in a case where the service ID of 0x0130, the services have the same service ID but have different service names and different LCNs. In order to process the same services, the services scanned in the memory are processed after being temporarily stored in the temporary storage unit in the case of auto scanning, while the scanned services together with the services already stored in the DB are stored in the temporary storage unit before being processed in the case of manual scanning. Therefore, in this case, the service of 570 MHz scanned first as default is selected, and the service name of "DDD" is allocated to the LCN of 2 as shown in Table 3. The service ID of 0x0130, which is a service ID of the service having LCN 3, is removed from the temporary storage unit 250.

Further, services having service IDs of 0x0282 and 0x0375 have the same LCN of 3. In this case, the service, which has the service name of "FFF" and has been scanned first as default, maintains its LCN, while the services having the service name of "HHH" are allocated sequential numbers from the number after the last LCN in order to prevent overlapping of the LCN.

In a case of the service ID of "0x0681", there is no service having the same service ID or the same LCN. Therefore, the LCN of 12 and the service name of "OOO" are maintained as they are.

In the case of the service ID of "0x0682", since the service does not have an LCN, the services are allocated sequential numbers from the number after the last LCN. Therefore, the service number of the service having the service ID of "0x0682" is changed to 14.

Exemplary embodiments of the present invention provide a scanning method, which is commonly applicable to all non-network scanning schemes in order to solve problems relating to the MFN boundary area and the LCN use standards, which may occur in the non-network scanning schemes. Accordingly, the scanning method can be applied to all non-network scanning schemes regardless of the LCN use standards.

Further, exemplary embodiments of the present invention provide a common scanning scheme, which is applicable to all countries, thereby reducing the maintenance cost.

In addition, exemplary embodiments of the present invention provide a common scanning scheme, which is not only commonly applicable to all non-network scanning schemes regardless of the LCN use standards but also illustrates a robust operation even in a continuously changing digital broadcast system and network.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for channel scanning in a digital broadcast system, the method comprising:
   deleting all services stored in a database;
   after deleting all services stored in the database, storing services scanned through each frequency in a temporary storage unit, based on whether or not identical service Identifiers (IDs) and identical Logical Channel Numbers (LCNs) of the scanned services exist and whether or not a service having no LCN exist among the scanned services;
   performing a channel scanning for all frequencies;
   when there are services including the identical service ID as a result of the channel scanning, selecting at least one service from the services including the identical service ID and deleting unselected services after a passage of a predetermined time interval if there is no user selection;

determining whether services remaining after the services including the identical service ID are removed from the scanned services, include services having the identical LCN;

in response to the remaining services including the services having the identical LCN, selecting one service to maintain the identical LCN from the services having the identical LCN and allocating LCNs sequentially increasing from an LCN after a last LCN to unselected services according to each respective service type after the passage of the predetermined time interval if there is no user selection;

determining whether the services remaining after the services including the identical service ID are removed from the scanned services include services that do not include LCN;

in response to the remaining services including the services that do not include the LCN, allocating LCNs sequentially increasing from the LCN after the last LCN to the services that do not include the LCN according to the respective service type; and storing the remaining services processed in the temporary storage unit in the database, wherein the services including the identical service ID are transmitted on different frequencies.

2. The method of claim 1, wherein the channel scanning comprises automatic scanning.

3. A method for channel scanning in a digital broadcast system, the method comprising:

copying services except for services of a frequency to be scanned from among services stored in a database into a temporary storage unit and deleting all the services stored in the database;

storing scanned services together with the service copied from the database in the temporary storage unit, based on whether or not identical service Identifiers (IDs) and identical Logical Channel Numbers (LCNs) of the scanned services exist and whether or not a service having no LCN exist among the scanned services;

performing a channel scanning for the frequency to be scanned;

when there are services including the identical service ID as a result of the channel scanning, selecting at least one service from the services including the identical service ID and deleting unselected services after a passage of a predetermined time interval if there is no user selection;

determining whether services remaining after the services including the identical service ID are removed from the scanned services include services having the identical LCN;

in response to the remaining services including the services having the identical LCN, selecting one service to maintain the identical LCN from the services having the identical LCN and allocating LCNs sequentially increasing from an LCN after a last LCN to unselected services according to each respective service type after the passage of the predetermined time interval if there is no user selection;

determining whether the services remaining after the services including the identical service ID are removed from the scanned services include services that do not include LCN; and in response to the remaining services including the services that do not include the LCN, allocating LCNs sequentially increasing from the LCN after the last LCN to the services that do not include the LCN according to the respective service type, wherein the services including the identical service ID are transmitted on different frequencies.

4. The method of claim 3, wherein the channel scanning comprises manual scanning.

5. The method of claim 3, further comprising storing the remaining services processed in the temporary storage unit in the database.

6. An apparatus for channel scanning in a digital broadcast system, the apparatus comprising:

a control unit for deleting all services stored in a database, after deleting the services stored in the database, storing services scanned through each frequency in a temporary storage unit, based on whether or not identical service Identifiers (IDs) and identical Logical Channel Numbers (LCNs) of the scanned services exist and whether or not a service having no LCN exist among the scanned services, and performing a channel scanning for all frequencies, for selecting at least one service from the services including the identical service ID and deleting unselected services after a passage of a predetermined time interval if there is no user selection when there are services including the identical service ID as a result of the channel scanning, for determining whether services remaining after the services including the identical service ID are removed from the scanned services include services having the identical LCN, for selecting one service to maintain the identical LCN from the services having the identical LCN and allocating LCNs sequentially increasing from an LCN after a last LCN to unselected services according to each respective service type after the passage of the predetermined time interval if there is no user selection when the remaining services include the services having the identical LCN, for determining whether the services remaining after the services including the identical service ID are removed from the scanned services include services that do not include LCN, and for allocating LCNs sequentially increasing from the LCN after the last LCN to the services that do not include the LCN according to the respective service type when the remaining services include the services that do not include the LCN; and the temporary storage unit for storing services scanned through each frequency, wherein the services including the identical service ID are transmitted on different frequencies.

7. The apparatus of claim 6, wherein, under control of the control unit, the remaining services processed in the temporary storage unit are stored in the database.

8. The apparatus of claim 6, wherein the control unit determines that the channel scanning comprises automatic scanning.

9. An apparatus for channel scanning in a digital broadcast system, the apparatus comprising:

a control unit for copying services except for services of a frequency to be scanned from among services stored in a database into a temporary storage unit, and deleting all the services stored in the database, for storing scanned services together with the service copied from the database in the temporary storage unit, based on whether or not identical service Identifiers (IDs) and identical Logical Channel Numbers (LCNs) of the scanned services exist and whether or not a service having no LCN exist among the scanned services, and performing a channel scanning for the frequency to be scanned, for selecting at least one service from the services including an identical service ID and deleting unselected services after a passage of a predetermined time interval if there is no user selection when there are services including the identical service ID as a result of the channel scanning, for determining whether services remaining after the services including the identical service ID are removed from the scanned services include services having the identical LCN, for selecting one service to maintain the identical LCN from the services having the identical LCN and allocating LCNs sequentially increasing from an LCN after a last LCN to unselected services according to each respective service type after the passage of the predetermined time interval if there is no user selection when the remaining services include the services having the identical LCN, for determining whether the services remaining after the services including the identical service ID are removed from the scanned services include services that do not include LCN, and for allocating LCNs sequentially increasing from the LCN after the last LCN to the services that do not include the LCN according to the respective service type when the remaining services include the services that do not include the LCN; and the temporary storage unit for storing services scanned through each frequency, wherein the services including the identical service ID are transmitted on different frequencies.

10. The apparatus of claim 9, wherein, under control of the control unit, the remaining services processed in the temporary storage unit are stored in the database.

11. The apparatus of claim 9, wherein the control unit determines that the channel scanning comprises manual scanning.

* * * * *